Jan. 15, 1952 H. C. GLITSCH 2,582,826

TRAY FOR USE IN REFINING TOWERS

Filed May 25, 1945 5 Sheets-Sheet 1

Inventor

Hans C. Glitsch

By Jack A. Ashley
Joseph H. Ashley

Attorneys

Jan. 15, 1952 H. C. GLITSCH 2,582,826

TRAY FOR USE IN REFINING TOWERS

Filed May 25, 1945 5 Sheets-Sheet 2

Inventor

Hans C. Glitsch

By Jack A. Ashley

Joseph H. Ashley

Attorneys

Inventor
Hans C. Glitsch
By Jack A. Ashley
Joseph H. Ashley
Attorneys

Jan. 15, 1952 H. C. GLITSCH 2,582,826

TRAY FOR USE IN REFINING TOWERS

Filed May 25, 1945 5 Sheets-Sheet 4

Inventor

Hans C. Glitsch

By Jack A. Ashley

Joseph H. Ashley

Attorneys

Jan. 15, 1952 | H. C. GLITSCH | 2,582,826

TRAY FOR USE IN REFINING TOWERS

Filed May 25, 1945 | 5 Sheets-Sheet 5

Inventor
Hans C. Glitsch
By Jack A. Schley
Joseph H. Schley
Attorneys

Patented Jan. 15, 1952 2,582,826

UNITED STATES PATENT OFFICE 2,582,826

TRAY FOR USE IN REFINING TOWERS

Hans C. Glitsch, Dallas, Tex., assignor, by mesne assignments, to Glitsch Engineering Company, Dallas, Tex., a partnership Application May 25, 1945, Serial No. 595,766

2 Claims. (Cl. 189—34)

This invention relates to new and useful improvements in trays for use in refining towers.

One object of the invention is to provide an improved tray for use in refining towers of various types, including bubble towers, the tray being so constructed that its component elements as well as its support may be fabricated from a minimum quantity of light-weight material, such as stainless steel or other corrosion-resistant material, thereby appreciably decreasing the weight of the tray and its cost of manufacture.

An important object of the invention is to provide an improved tray having a plurality of floor sections or deck plates frictionally fastened together so as to be readily separable in the event of sudden excessive pressure changes or explosions and thereby prevent irreparable damage to the sections or plates, the latter preferably having their marginal edges reinforced for the purpose of rigidifying and rendering the same self-supporting.

A particular object of the invention is to provide an improved tray which is particularly adaptable for use in vessels of relative small diameter and which has offset reinforcing portions at the adjacent marginal edges of its floor sections with the contiguous edge portions being frictionally fastened together and coacting to support the sections, there being auxiliary means associated with one or both of said contiguous edge portions for reinforcing the same.

Another object of the invention is to provide an improved tray, of the character described, wherein reinforcing means consisting of flat or angular bars extend longitudinally of the contiguous edge portions of adjacent floor sections and may be frictionally clamped to one or both of said edge portions for strengthening and adding rigidity to the sections; the bars being spaced from the wall of the vessel within which the tray is mounted or being secured thereto so as to provide auxiliary supports for said tray and its floor sections.

A further object of the invention is to provide an improved tray, of the character described, wherein the floor sections have expansion means made integral therewith to compensate for thermal expansion and contraction of said sections, the expansion means preferably extending longitudinally of the sections adjacent one edge thereof and the same being sealed off to prevent leakage from one tray to another.

A construction designed to carry out the invention will be hereinafter described together with other features of the invention.

Figure 1:
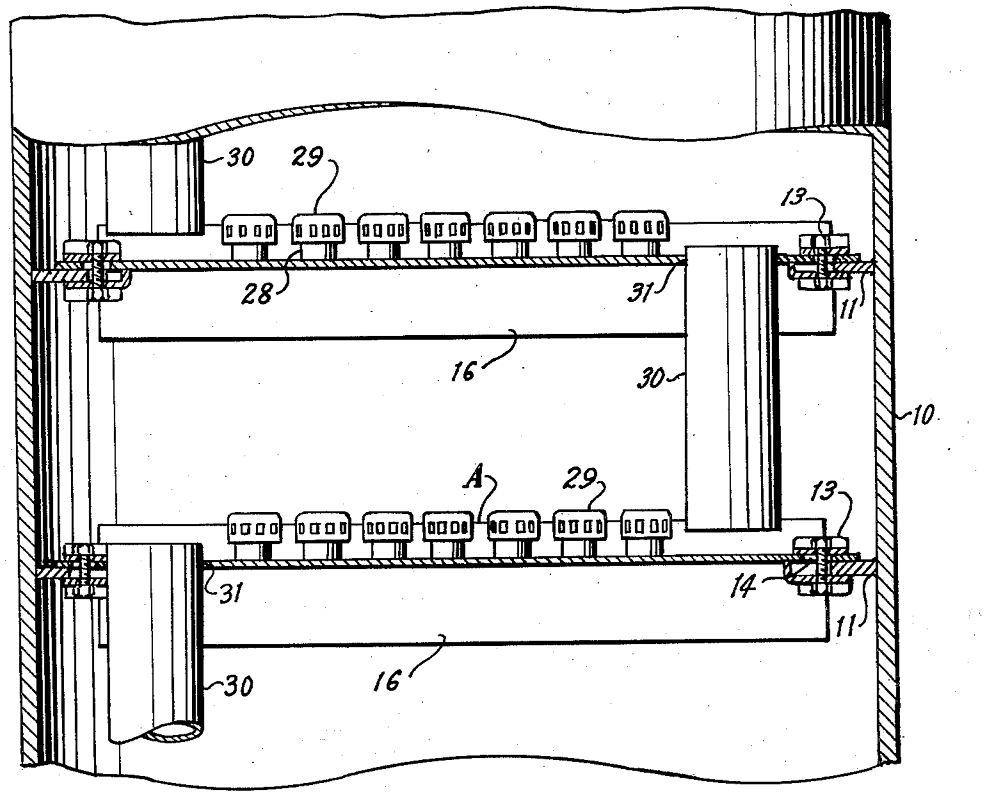
Figure 2:
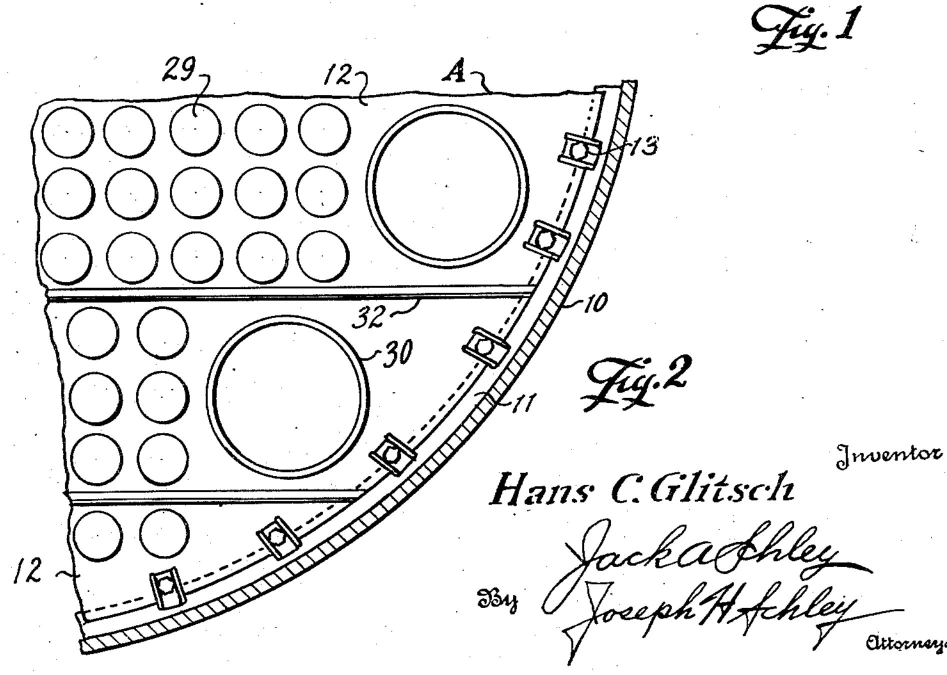
Figures 3, 4, 5, 6:
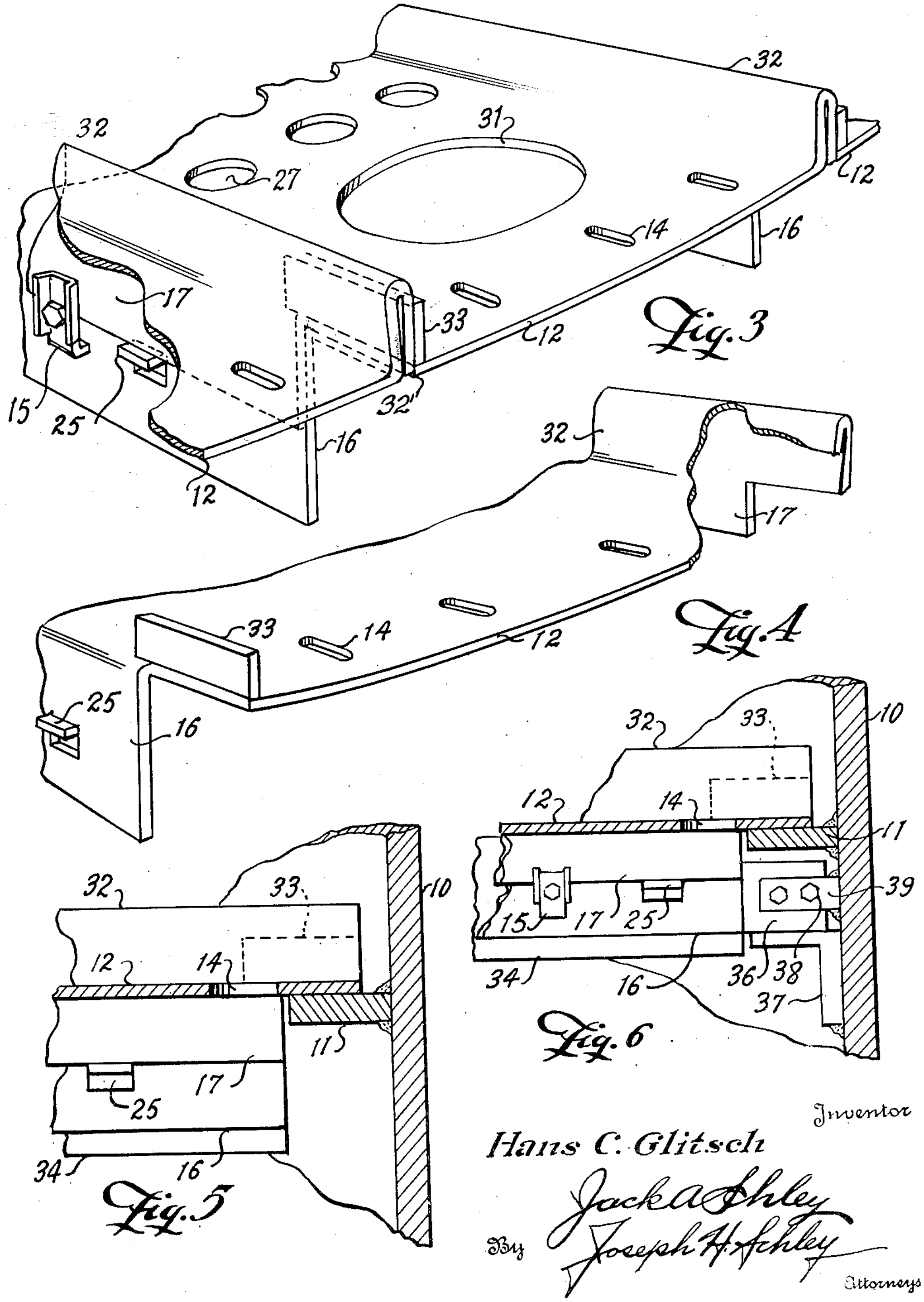
Figure 7:
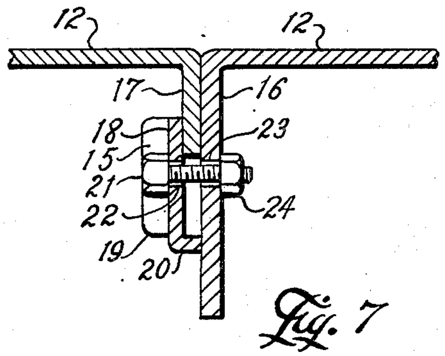
Figure 8:
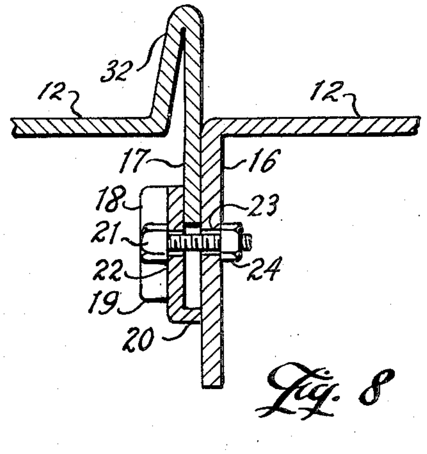
Figure 9:
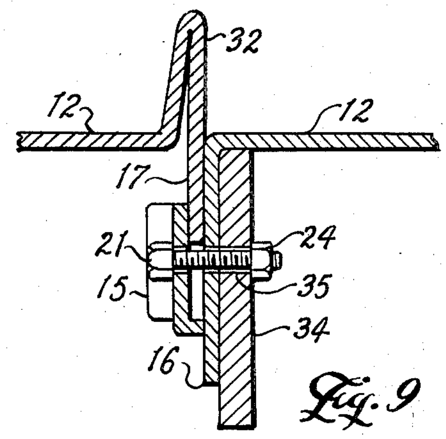
Figure 10:
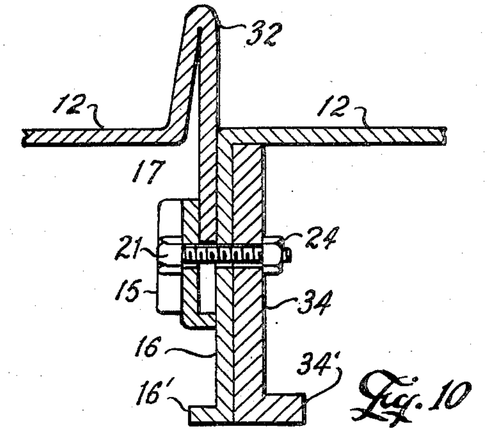
Figure 12:
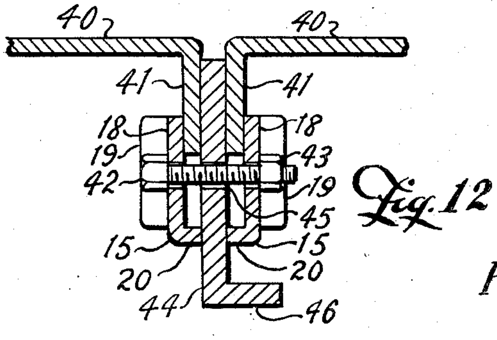
Figure 11:
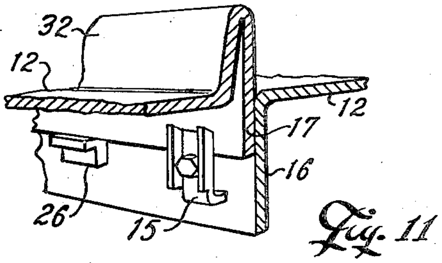
Figure 13:
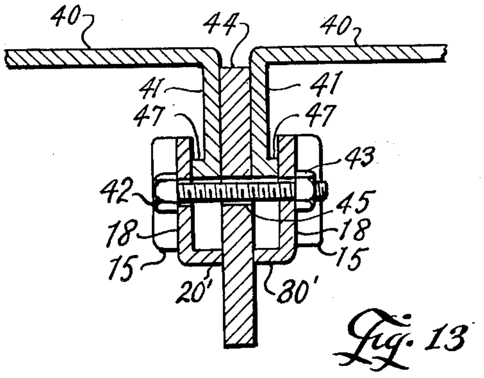
Figure 14:
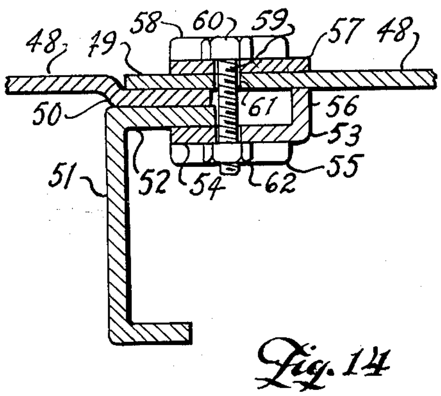
Figure 15:
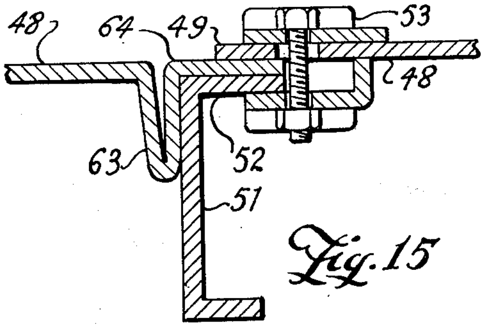
Figures 17, 18:
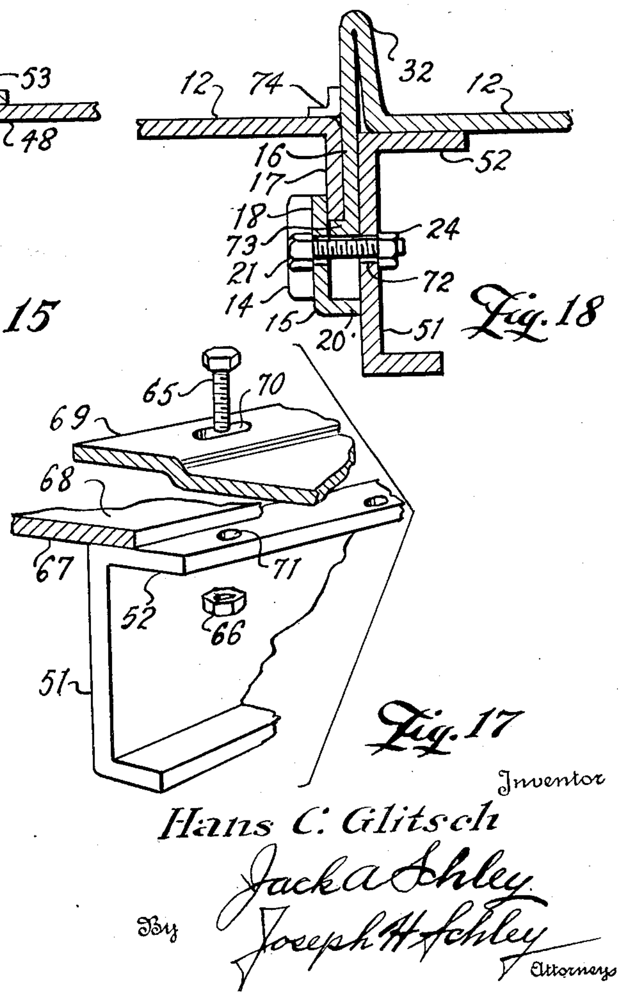
Figure 16:
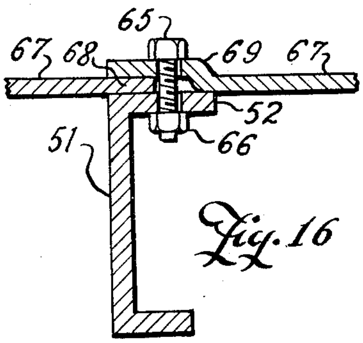
Figure 19:
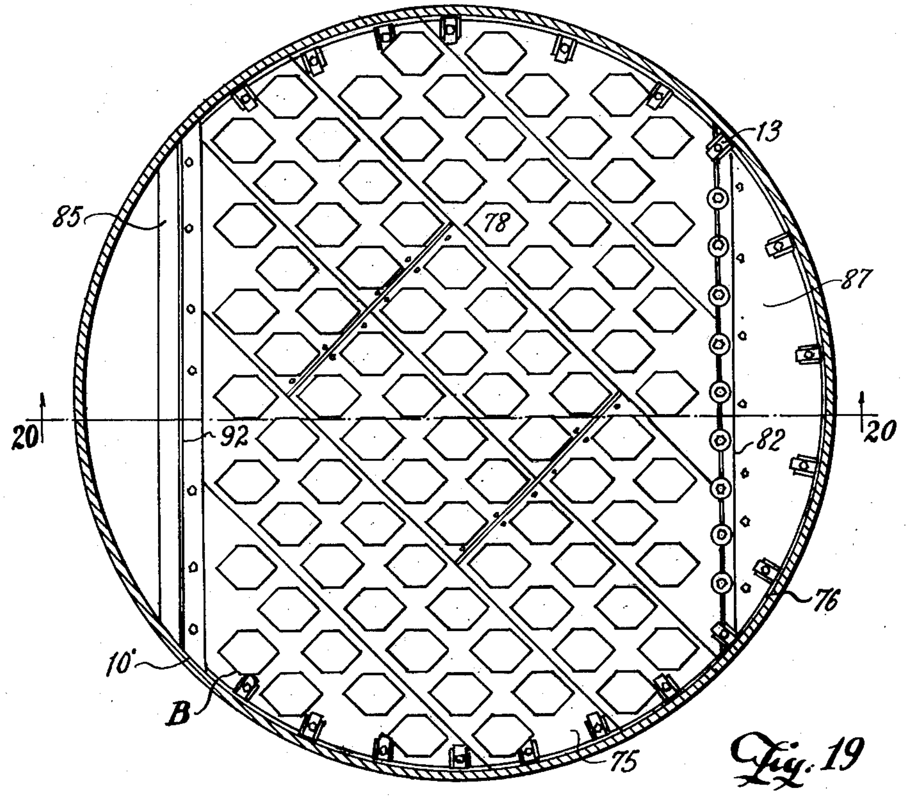
Figure 20:
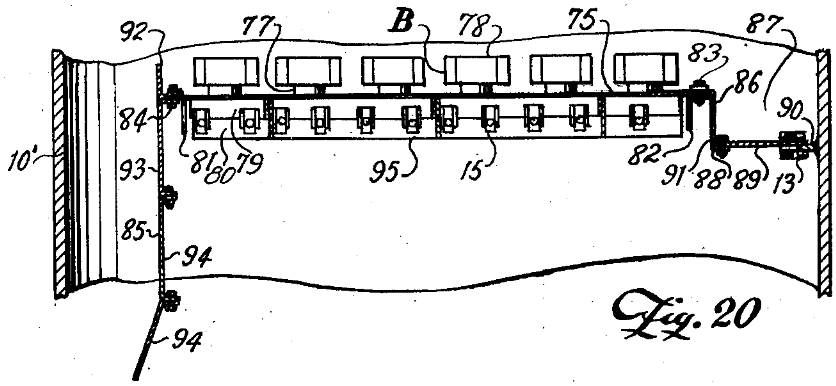

The invention will be more readily understood from a reading of the following specification and by reference to the accompanying drawings, wherein an example of the invention is shown, and wherein:

Fig. 1 is a view, partly in elevation and partly in section, of a portion of a refining tower having trays, constructed in accordance with the invention, Fig. 2 is a plan view of a portion of one of the trays, Fig. 3 is an enlarged, isometric view of one end of a floor section, illustrating its construction and connection to adjacent sections, Fig. 4 is a view, similar to Fig. 3, showing the end portion of the floor section disconnected from the adjacent sections, Fig. 5 is a transverse, vertical, sectional view, showing the connection of the floor section to the peripheral ring of the tank wall, Fig. 6 is a view, similar to Fig. 5, of a slightly modified construction, Fig. 7 is a transverse, vertical sectional view, illustrating the relationship and connection of the contiguous edge of adjacent floor sections, Fig. 8 is a similar view, showing the provision of expansion means, Fig. 9 is a similar view of a modified form of construction, Fig. 10 is a similar view of a slight modification of the construction shown in Fig. 9, Fig. 11 is a partial isometric view of the construction shown in Fig. 8, Fig. 12 is a view, similar to Fig. 7, of another form of construction, Fig. 13 is a similar view of a slight modification of the construction shown in Fig. 12, Figs. 14, 15 and 16 are similar views of modified forms of construction, Fig. 17 is a partial isometric view of the construction shown in Fig. 16, Fig. 18 is a view, similar to Figs. 9 and 10, illustrating a slight modification of the constructions shown therein, Fig 19 is a plan view of a modified form of tray, and Fig. 20 is a transverse, vertical, sectional view, taken on the line 20—20 of Fig. 19.

In the drawings, the numeral 10 designates a cylindrical tank which forms the shell of a refining tower and shown, for the purposes of illustration, as being of the bubble tower type. Only a portion of the tank has been shown and the same way may be of any desired construction, diameter and height. A plurality of trays or decks A extend transversely across the interior of the tank at spaced intervals or elevations and throughout the height of said tank in the usual manner, the quantity and spacing of the trays being subject to variation according to the size and particular use of the tank. It is pointed out that the present invention relates particularly to the construction and mounting of the trays and that only two trays have been shown with additional trays, which are normally disposed above and below said illustrated trays, being omitted. Attention is directed to the fact that this invention is not to be limited to use in connection with the particular tower shown and described herein, since it may be successfully used in any refining column or tower having super-imposed trays or decks mounted therein. Manifestly, the processing of the hydrocarbon or other fluids within the tower forms no part of the present invention and any conventional method of operation may be employed.

Each tray A is supported within the tank 10 by a substantially annular, flat ring 11 which is secured to the internal cylindrical surface of said tank by welding, or other suitable means, and preferably projects radially inwardly of said surface, as is best shown in Figs. 1, 2, 5 and 6. A plurality of deck plates or floor sections 12, of stainless steel or other light-weight and preferably corrosion-resistant material, have their end portions supported upon the ring 11 and frictionally fastened thereto by suitable clamps 13, shown in my Patent No. 2,341,091, issued February 8, 1944, which clamps are received by elongate openings or slots 14 formed in the end portions of the floor sections. Manifestly, this frictional clamping of the floor sections permit the same to undergo longitudinal movement upon thermal expansion and contraction. As shown in Figs. 2–4, the floor sections extend transversely of the tank in parallel relation and each section is of relatively narrow width compared to its length. The adjacent longitudinal edge portions of the floor sections are adapted to be frictionally fastened together by suitable clamps 15 which are similar to the clamps 13, as will be hereinafter more fully explained. For reinforcing and adding rigidity to the floor sections, depending legs or flanges 16 and 17 may be formed by bending the longitudinal edge portions of each section downwardly at substantially a right angle and it is preferable that the flange 16 be of greater transverse or vertical width than the flange 17 so as to extend therebelow (Fig. 7). In order for the end portions of each section to overlie the ring 11, the flanges are of less length than the section so as to terminate short of its end portions as shown in Figs. 4 and 5.

Each clamp 15 includes an angular member or plate 18 having longitudinal, lateral flanges or wings 19 projecting from one flat surface and a transverse lug 20 extending laterally in the opposite direction at one end. The plate 18 is adapted to be fastened to the wider flange 16 of each floor section and overlies a portion of the contiguous narrow flange 17 of the adjacent section with the lug 20 engaging said flange 16, as is best shown in Figs. 3 and 7. A bolt 21 extends through an opening 22 in the plate 18 and then through an opening 23 formed in the flange 16 below the lower marginal edge of the flange 17 so as to receive a suitable nut 24. Thus, when the nut 24 is tightened, the plate 18 will be moved into snug engagement with both flanges so as to draw said flanges together and frictionally clamp the flange 17 between said plate and the flange 16. Due to this frictional clamping of the floor sections, the same may undergo movement relative to each other in the event of sudden excessive pressure changes created by explosions or other causes so as to minimize damage to said sections and permit re-use thereof.

Although the lower marginal edge of each flange 17 is illustrated as being spaced above the bolts 21, it is obvious that the same could engage and rest upon said bolts. If desired, each flange 17 may be supported by lateral lugs 25 preferably made integral with and formed out of the contiguous flange 16 (Figs. 3 and 4) or by angular clips or brackets 26 secured to the latter flange as shown in Fig. 11. A plurality of spaced, vapor openings 27 are formed in each floor section for receiving risers 28 upon which the usual bubble caps 29 are mounted. In the illustrated construction, liquid is conducted to each tray A from the tray thereabove and the liquid flows diametrically across said tray to downcomers 30 which lead to the tray therebelow (Fig. 1). The downcomers 30 are disposed diametrically opposite the point of introduction of the liquid to the tray and are preferably supported in openings 31 (Fig. 3) formed in the end portions of the central floor sections so as to be positioned adjacent the peripheral wall of the tank.

In order to compensate for thermal expansion and contraction of the floor sections as well as to reinforce the same, an upstanding, co-extensive expansion knee or member 32 (Figs. 8, 9, 10 and 11) may be formed in or made integral with each section and is preferably located at one longitudinal edge portion thereof. As is clearly shown in Figs. 8 and 11, the expansion knee 32 is formed by bending one edge portion of the section upwardly upon itself at substantially a right angle and then vertically bending this portion downwardly perpendicular to said section. It is desirable to provide the expansion knee contiguous to each narrow flange 17, whereby said flange forms a continuation of said knee and is connected to its floor section by the same. Each end of the knee is crimped together as shown by the numeral 32′ (Fig. 3) and may be welded to prevent leakage at such points. In order to assure against leakage, a short plate or bar 33 may be secured longitudinally to each end of the floor section in the vertical plane of its wide flange 16 so as to intimately engage the outer, flat surface of the knee 32 of the adjacent section. However, it is noted that the expansion knee as well as the bar 33 may be omitted as shown in Fig. 7.

In order to additionally reinforce and add rigidity to the floor sections, an elongate flat plate or bar 34 is suitably secured to each section and may be formed of similar material, but is of heavier gauge or greater thickness. Due to the provision of the section flanges and the frictional clamping of the same, it is desirable to fasten the bar 34 to the inner, vertical surface of the wide flange 16 so as to extend longitudinally of and parallel to said flange (Fig. 9). A plurality of openings 35 are formed in each reinforcing bar and are adapted to register with the openings 23 of the flange 16 for receiving the bolts 21 of the frictional clamps 15 so as to fasten the bar and flange together, or said bar may be connected to said flange in any other suitable manner. The bars are preferably of greater vertical width than the flanges 16 so as to depend therebelow. If desired, the bars may be of substantially the same length as the flanges so as to terminate short of the ends of the floor sections and thereby be spaced from the peripheral wall of the tank as shown in Fig. 5. However, a tongue 36, of reduced transverse or vertical width, may project longitudinally from each end of certain or all of the reinforcing bars beyond the flange, whereby said bars are of increased length and have their tongues disposed beneath the ring 11 as shown in Fig. 6. An angular support or bracket 37 is welded or otherwise secured to the inner peripheral surface of the tank for receiving each tongue 36 which is fastened by suitable bolts 38 to an inwardly-extending lug 39 disposed above the bracket and similarly connected to said tank surface. Thus, all or certain of the bars may function as beams for supporting the weight of the trays A and withstanding predetermined pressures. Of course, the use of the bars as supporting beams is especially desirable in high-temperature or high-pressure vessels as well as in tanks of relatively large diameters. It is pointed out that either or both the flanges 16 and the bars 34 may be strengthened by the provision of lateral, co-extensive flanges or legs 16' and 34', respectively, at their lower longitudinal edge portions as shown in Fig. 10.

Instead of the floor sections 12 with their wide flanges 16 and narrow flanges 17, floor sections or deck plates 40 having a pair of narrow, depending legs or flanges at their longitudinal edge portions may be employed as shown in Figs. 12 and 13. In all other respects, the plates 40 may be identical to the sections 12 and may have the flanges 41 or the flanges 17 as shown in Fig. 11. For frictionally fastening the flanges 41 of adjacent deck plates together, the clamps 15 are adapted to be used in pairs with the clamp plates 18 engaging the inner, flat surfaces of said flanges and connected together by bolts 42 and nuts 43. A bar 44, similar to the bar 34, is preferably clamped between the adjacent flanges and is provided with a plurality of openings 45 for receiving the bolts 42, whereby the lugs 20 of each pair of clamps will bear against opposite surfaces of the bar 44. Thus, the clamps will be carried by the bar and the deck plates may be reinforced by utilizing such a bar in frictionally clamping together the adjacent flanges of said plates. If desired, a co-extensive, lateral flange or leg 46 for adding rigidity to each bar 44 may be formed by bending the lower longitudinal edge portion of the bar upon itself at substantially a right angle (Fig. 12). The bars are preferably secured to the inner peripheral surface of the tank 10 in the manner illustrated in Fig. 6 so as to function as supporting beams, but may terminate flush with the ends of the flanges 41 (Fig. 5). A lateral, co-extensive leg 47 may be formed by bending the lower longitudinal edge portion of each flange 41 inwardly upon itself at substantially a right angle (Fig. 13) so as to reinforce the flange. Manifestly, the outer ends of the legs 47 would be engaged by the inner, flat surfaces of the clamp plates 18 and said plates would be provided with lugs 20', of slightly greater length than the lugs 20, for accommodating said legs which increase the effective width of the flanges. Also, the flange 46 of the bar 44 may be omitted as shown in Fig. 13.

A modified form of deck plate or floor section 48 is illustrated in Fig. 14 and has an alined, flat, longitudinal edge portion 49, while its other or opposite longitudinal edge is offset downwardly to provide a parallel, co-extensive flange or tongue 50. The floor sections 48 are of the same general construction and material as the sections 12 and plates 40 and are adapted to have its longitudinal edges supported and fastened to a channel bar or beam 51 with the alined edge portion 49 of one section overlying the tongue 50 of the adjacent section. One flange or leg of the channel bar is of greater transverse width than the other parallel leg as shown at 52 and said legs extend horizontally so as to dispose the leg 52 upwardly in underlying relationship to the tongue 50 of the floor section. Of course, the lower, narrow leg of the bar may be eliminated in certain installations. For frictionally fastening the edges of the floor section to each other and to the upper leg of the channel bar, a plurality of frictional clamps 53, substantially identical to the clamps 13 and similar to the clamps 15, are provided. Each clamp 53 includes a lower angular plate 54, having longitudinal wings 55 and a transverse lug 56, and a complementary upper plate 57 which has upstanding, longitudinal wings 58. The flat surface of the lower plate 54 is adapted to engage the underside of the leg 52 with its lug 56 bearing against the lower surface of the edge portion 49 of the section, while the upper plate 57 overlies said edge portion and is provided with an opening 59 for receiving a bolt 60. A plurality of openings 61 are formed in the edge portion 49 and one of the bolts 60 is adapted to extend through each opening and have its lower end screw-threaded within a nut 62 which is welded or otherwise secured to the lower plate 54. Thus, tightening of the bolts will draw the plates 54 and 57 together so as to frictionally clamp the edge portion 49 and tongue 50 to each other and to the upper leg 52 of the bar 51.

It is pointed out that the channel bars may terminate short of the ends of the floor sections or project therebeyond so as to be fastened to the wall of the tank 10 in substantially the same manner as the bars 34 (Figs. 5 and 6). An inverted or depending expansion knee or member 63, similar to the knee 32, may be formed along one longitudinal edge of each floor section 48 by bending one edge portion downwardly upon itself at substantially a right angle, then vertically upwardly and finally laterally at substantially a right angle so as to provide a flat, alined flange 64 as shown in Fig. 15. The offset tongue 50 is preferably omitted and the alined flange 64 is adapted to be substituted therefor so as to be frictionally clamped between the upper leg 52 of the bar 51 and the flat edge portion 49 of the adjacent floor section by the clamps 53. Of course, the expansion knee 63 compensates for thermal expansion and contraction of its floor section as well as reinforce the same and could project upwardly, similar to the knee 32, or said latter knee might be inverted so as to depend below its floor section 12.

As shown in Figs. 16 and 17, a plurality of bolts 65 and nuts 66 may be used in place of the clamps 53 for fastening the longitudinal edges of adjacent floor sections together and to the channel bar 51. In this event, flat deck plates or floor sections 67 are provided and each section is provided with an alined, flat edge portion 68 which is adapted to engage and be supported by the upper leg 52 of one of the channel bars. The longitudinal edge of the adjacent section is upset so as to form a parallel, offset flange or tongue 69 for overlying the edge portion 68 resting upon the upper leg of the bar. A plurality of elongate slots 70 are provided in the offset tongue 69 and extend longitudinally thereof for registering with openings 71 formed in the leg 52. One of the bolts 65 extends through each slot 70 and registering opening 71 so as to depend below the leg and receive one of the nuts 66 upon its lower end. Since the edge portion 68 of one floor section is confined between the tongue 69 of the adjacent section and the leg of the bar, tightening of the nuts 66 will force the bolts 65 downwardly so as to draw said tongue toward said leg and thereby frictionally clamp said edge portion therebetween. Thus, each floor section has one longitudinal edge frictionally fastened to the longitudinal edge of the adjacent section and to the bar therebelow, while its opposite edge is positively fastened to another bar. Due to the provision of the elongate slots 70, irregularities of construction are compensated for in alining said slots with the openings 71. These slots are adapted to be sealed or closed by the underlying leg 52 of the channel bar and this sealing is assisted by said slots being located sufficiently adjacent the upset as to dispose the edge of the flat portion of the floor section in overlying engagement with said leg. The bolts 65 have a snug fit within the openings 71 and the engagement of nuts 66 with the underside of the leg seals said openings, although gaskets could be used.

As is clearly shown in Fig. 18, the channel bars 51 may be utilized in connection with the frictional clamping of the adjacent longitudinal edges of the floor sections 12. In this construction, the flanges 16 are of decreased width and are merely frictionally fastened to the bars by the clamps 15. Openings 72 are formed in the vertical portion or web of each channel bar for receiving the bolts 21 of the clamps and the latter are provided with the lugs 20′ of increased length, whereby the depending flanges 16 and 17 may be frictionally clamped to the bar by the clamp plates 18. Although the expansion knee 32 is illustrated as being interposed between each flange 16 and its floor section in Fig. 18, it is manifest that the same could be formed integral with the flange 17 as shown and described hereinbefore. For positioning the flange 17 relative to the adjacent flange 16, a lateral, co-extensive leg 73 may be formed at the lower longitudinal edge of said flange 16, or the latter flange might have a plurality of angular clips or brackets 74 secured to its upper portion, which portion merges into and forms a part of the knee 32, so as to be disposed above said flange 17 and engage the upper surface of its floor section. It is believed to be readily obvious that the leg 73, brackets 74, lugs 25 and brackets 26 perform substantially the same function and may be substituted for one another.

Although the floor sections have been illustrated as extending longitudinally parallel to the diametric flow of the liquid across the trays A in Figs. 1, 2 and 3, it is pointed out that this relationship is not essential or necessarily desirable and that said floor sections may extend across or at angle to such flow. A modified form of tray construction B is shown in Figs. 19 and 20 and includes a plurality of elongate floor sections 75 arranged in parallel relationship. A substantially annular ring 76, similar to the ring 11, is welded or otherwise secured to the tank wall 10′ for supporting the outer marginal edges of the floor sections, which edges are frictionally fastened to the ring 76 by the clamps 13. The floor sections have the usual risers 77 communicating with their vapor openings (not shown) and modified bubble caps 78 are mounted upon the risers (Fig. 20). The adjacent longitudinal edge portions of the sections are formed with depending, co-extensive flanges 79 and 80, similar to the flanges 16 and 17, and these flanges are frictionally fastened together by the clamps 15 in a similar manner. A pair of parallel channel bars or beams 81 and 82 extend transversely across the interior of the tank adjacent diametrically-opposite portions of the peripheral wall of said tank and are suitably secured to said wall or the ring 76. The channel bars are disposed at an angle of approximately forty-five (45°) degrees to the longitudinal axes of the sections 75 and one end of each section is adapted to overlie one of said bars. Suitable bolts 83 and nuts 84 frictionally clamp the overlying section ends to the bars in the manner illustrated in my Patent No. 2,210,808, issued August 6, 1940, which overlying ends are cut off at a forty-five (45°) degree angle so as to be in substantially the same vertical planes as said bars.

A weir type downcomer 85 is disposed externally of the bar 81, while the outer depending flange 86 of the bar 82 is of increased vertical width or length for supporting and forming a part of a sump 87. The flange 86 has an outwardly-directed, longitudinal leg 88 at its lower end, which leg is bolted or otherwise secured to a plate 89 forming the bottom of the sump 87. A segment 90 of the tank ring 76 is preferably cut out and stepped downwardly or lowered for supporting the outer, arcuate margin of the bottom plate 89 of the sump. The clamps 13 are employed to frictionally clamp the sump bottom plate 89 to the ring segment 90 and the latter may be connected to said ring by vertical, interconnecting portions 91. It is pointed out that the downcomer of the overlying tray (not shown) is disposed directly above the sump 87 and that the downcomer 85 of the illustrated tray overlies the sump of the tray therebelow.

For controlling the level of the liquid on the tray, an angle bar or weir 92 is fastened by the bolts 83 and nuts 84 to the top of the bar 81 and no floor section or plate is disposed between said bar and the tank wall so as to provide an opening therebetween. A transversely-extending, vertical partition 93 depends from the bar 81 for forming the downcomer 85 and may be composed of several flanged sections 94 which are preferably bolted together. The uppermost section 94 may be made integral with the bar as a depending flange, similar to the flange 86 of the bar 82, while the lowermost section is inclined outwardly toward the tank wall. Manifestly, the liquid from the tray will overflow the weir 92 and pass downwardly through the downcomer formed by the tank wall and the partition 93 so as to be directed into the sump of the tray therebelow.

It is pointed out that the centralmost floor sections 75 may be formed of several short sections 95 to provide a manway in the tray and the marginal edges of these short sections may be secured similarly to the flanges 79 and 80, which are frictionally fastened together by the clamps 15.

The construction described hereinbefore makes it possible to fabricate an entire tray, with or without its downcomer, from light-weight material without materially decreasing its strength or rigidity. Of course, the use of lightweight material reduces the cost and time of manufacture and facilitates assembly of the component elements of the tray. The particular material employed forms no part of the present invention, but a tray of the described construction may be economically constructed of stainless steel or other corrosion-resistant material. Although the described tray construction is particularly adaptable for use in towers or vessels of relatively small diameter, it is pointed out that supporting beams may be provided by connecting the reinforcing bars to the walls of the towers or vessels so as to permit the use of said tray construction in larger diameter as well as high-temperature or high-pressure tanks and vessels. However, it is believed to be readily apparent that the offset or flanged portions of the floor section appreciably strengthen and add rigidity to such sections. It is also noted that this tray construction may be employed in refining towers or vessels of various types, and is not to be limited to use in bubble towers as illustrated herein.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A refinery tray assembly including, a plurality of elongate substantially parallel horizontal floor sections having their longitudinal edge portions in close proximity, each section being bent upon itself along one longitudinal edge portion into an upstanding thermal expansion and contraction knee normally open longitudinally of its bottom, the outer wall of the knee extending below the floor section and forming a depending knee flange, the adjacent longitudinal edge portion of the next section being bent down into a depending flange extending a substantial distance below the knee flange, and separate friction clamps frictionally engaging the knee flange and the extending portion of the other flange.

2. A circular refinery tray assembly including, a plurality of elongate horizontal sections, support means at the ends of said sections, each section having an uptstanding longitudinal knee with its bottom transversely open, the outer wall of each knee being extended below its section and forming a knee flange, the adjacent section having a longitudinal depending flange with its upper portion in parallel contact with the knee flange and extending below said flange, the depending flange having bolt holes below the lower edge of the knee flange, upright clamps approximately parallel to all the flanges having their upper ends frictionally engaging the lower portions of the knee flanges and their lower portions frictionally engaging the sides of the depending flanges, and bolts passing through said depending flanges below the knee flanges and through the clamps, the knee flanges being frictionally held and free to move vertically with their knees.

HANS C. GLITSCH.

REFERENCES CITED

The following references are of record in the file of this patent:

UNITED STATES PATENTS

| Number | Name | Date |
|---|---|---|
| 749,943 | McEvoy | Jan. 19, 1904 |
| 958,557 | Stiggleman | May 17, 1910 |
| 1,083,773 | Taylor | Jan. 6, 1914 |
| 1,178,491 | Clasen | Apr. 11, 1916 |
| 1,606,509 | Campbell | Nov. 9, 1926 |
| 1,665,916 | Eschholz | Apr. 10, 1928 |
| 1,965,549 | Holmes et al. | July 3, 1934 |
| 1,983,476 | Lincoln | Dec. 4, 1934 |
| 1,986,998 | Burgess et al. | Jan. 8, 1935 |
| 1,988,029 | Wolfe | Jan. 15, 1935 |
| 2,006,986 | DeFlorez | July 2, 1935 |
| 2,042,797 | Nechin | June 2, 1936 |
| 2,120,802 | Focht | June 14, 1938 |
| 2,145,469 | Weinland | Jan. 31, 1939 |
| 2,210,808 | Glitsch | Aug. 6, 1940 |
| 2,320,073 | Gibb | May 25, 1943 |
| 2,341,091 | Glitsch | Feb. 8, 1944 |
| 2,354,976 | Robinson | Aug. 1, 1944 |
| 2,375,409 | Glitsch | May 8, 1945 |